United States Patent
Walch et al.

(10) Patent No.: US 8,458,997 B2
(45) Date of Patent: Jun. 11, 2013

(54) PLANT MOWER-CONDITIONER COMPRISING A DEVICE FOR UNIFORMLY DISTRIBUTING PLANTS THROWN BACK TO THE GROUND

(75) Inventors: Martin Walch, Dettwiller (FR); Bernard Wattron, Haegen (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 13/380,074

(22) PCT Filed: Jul. 5, 2010

(86) PCT No.: PCT/FR2010/051412
§ 371 (c)(1),
(2), (4) Date: Dec. 22, 2011

(87) PCT Pub. No.: WO2011/004110
PCT Pub. Date: Jan. 13, 2011

(65) Prior Publication Data
US 2012/0090288 A1 Apr. 19, 2012

(30) Foreign Application Priority Data
Jul. 8, 2009 (FR) ...................................... 09 54712

(51) Int. Cl.
*A01D 61/00* (2006.01)
(52) U.S. Cl.
USPC ............................. 56/16.4 R; 56/16.4 A; 56/6
(58) Field of Classification Search
USPC ................. 56/6, 16.4 A–16.4 C, 16.4 R, 192
See application file for complete search history.

(56) References Cited

U.S. PATENT DOCUMENTS

| 3,699,755 | A | * | 10/1972 | Hauser ........................ 56/16.4 R |
| 4,099,364 | A | * | 7/1978 | Kanengieter et al. ...... 56/16.4 C |
| 4,182,099 | A | * | 1/1980 | Davis et al. ................ 56/16.4 R |
| 4,196,567 | A | * | 4/1980 | Davis et al. ..................... 56/13.7 |
| 4,233,803 | A | * | 11/1980 | Davis et al. ..................... 56/14.9 |
| 4,896,483 | A | * | 1/1990 | O'Halloran et al. ................ 56/1 |
| 5,022,219 | A | * | 6/1991 | Knurr et al. ................ 56/16.4 R |
| 5,966,913 | A | * | 10/1999 | Neuerburg ................ 56/16.4 R |
| 6,453,654 | B1 | * | 9/2002 | Kraus et al. ................ 56/16.4 R |
| 7,337,599 | B2 | * | 3/2008 | Wilhelm ................... 56/16.4 R |
| 2008/0120956 | A1 | | 5/2008 | Gradoz et al. |

FOREIGN PATENT DOCUMENTS

| EP | 0 258 930 | 3/1988 |
| EP | 0 524 131 | 1/1993 |
| EP | 1 927 278 | 6/2008 |

OTHER PUBLICATIONS

International Search Report Issued Sep. 6, 2010 in PCT/FR10/51412 Filed Jul. 5, 2010.

* cited by examiner

*Primary Examiner* — Alicia Torres
(74) *Attorney, Agent, or Firm* — Oblon, Spivak, McClelland, Maier & Neustadt, L.L.P.

(57) ABSTRACT

A mower-conditioner including a plant mowing mechanism including a cutting device, a plant conditioning system and a mechanism lifting these elements relative to the ground, this assembly being carried by a frame and including a fairing, the machine also including a plant ejection channel positioned as an extension of the plant conditioning system. The fairing is articulated to the plant ejection channel by a transverse axis that is positioned inside the machine, above and slightly behind the plant conditioning system, and the plant ejection channel is itself articulated to the frame.

8 Claims, 6 Drawing Sheets

PLANT MOWER-CONDITIONER COMPRISING A DEVICE FOR UNIFORMLY DISTRIBUTING PLANTS THROWN BACK TO THE GROUND

The invention relates to a plant mower-conditioner comprising a device for uniformly distributing plants after mowing when they are thrown back to the ground.

The machine according to the invention includes a frame that carries a mowing mechanism equipped with a cutting device, a plant conditioning system, and a plant ejection channel directing the plants towards the rear of the machine. The assembly is connected to a tractor by a drawbar and is carried by two wheels located at the lateral ends of the machine.

Such a machine includes parts that must be movable with the cutter bar relative to the frame so that the cutter bar is able to follow the unevennesses of the ground. The mower-conditioner must also be equipped with lifting means to avoid obstacles on the ground and to enable the machine to be transported on roads and paths while avoiding the risk that the tools may come into contact with the ground.

Besides the lifting means, the machine also includes a protective fairing fastened to the cutting device.

On the known machines, the fairing, the cutter bar, the conditioning system and the plant ejection channel constitute a rigid assembly that is movable vertically to avoid obstacles and for transport.

This rigid assembly in which all of the elements are rigidly fastened to each other, is fully adequate as regards the work of the machine during the mowing operation. However, problems arise during the conditioning and spreading of the cut plants when the assembly is raised, in order to avoid an obstacle for example. In this situation, the direction in which the plants are ejected changes according to the positioning of the tools and of the channel, the cut plants do then not longer fall down in an even layer.

Furthermore, in the known machines, given the movement of the rigid assembly and particularly of the rear part when the cutting tools are raised, it must be ensured that the position of the frame is sufficiently high above the ground, this positioning is not favourable for the stability of the machine.

The object of the invention is therefore to resolve these main difficulties by proposing a mower-conditioner including a fairing that is articulated to the plant ejection channel, which in turn is articulated to the frame.

The present invention relates to a mower-conditioner comprising a frame carrying a plant mowing mechanism equipped with a cutting device, a plant conditioning system, and means for lifting these elements relative to the frame, this assembly being provided with a fairing, the machine which is further equipped with a plant ejection channel positioned as an extension of the plant conditioning system is characterized in that the fairing is articulated to the plant ejection channel by means of a transverse axis positioned behind the plant conditioning system, and in that the plant ejection channel is itself articulated to the frame.

The mower-conditioner according to the invention has several essential advantages:

- due to the provided articulations, the plant ejection channel remains in essentially the same position irrespective of the position of the cutter bar, that is to say regardless of whether the machine is in the lowered work position or in the raised position to avoid an obstacle, with the result that plants ejected by the machine onto the ground are always distributed evenly,
- due to this stable position of the rear part, the frame can be disposed lower relative to the ground, lending the machine greater stability, which is particularly appreciable when the machine is working on a hillside, for example.

Other features and advantages of the invention will emerge from the description that follows with reference to the attached drawings, which are solely given as non-limiting exemplary embodiments. In these drawings.

Figure 1:
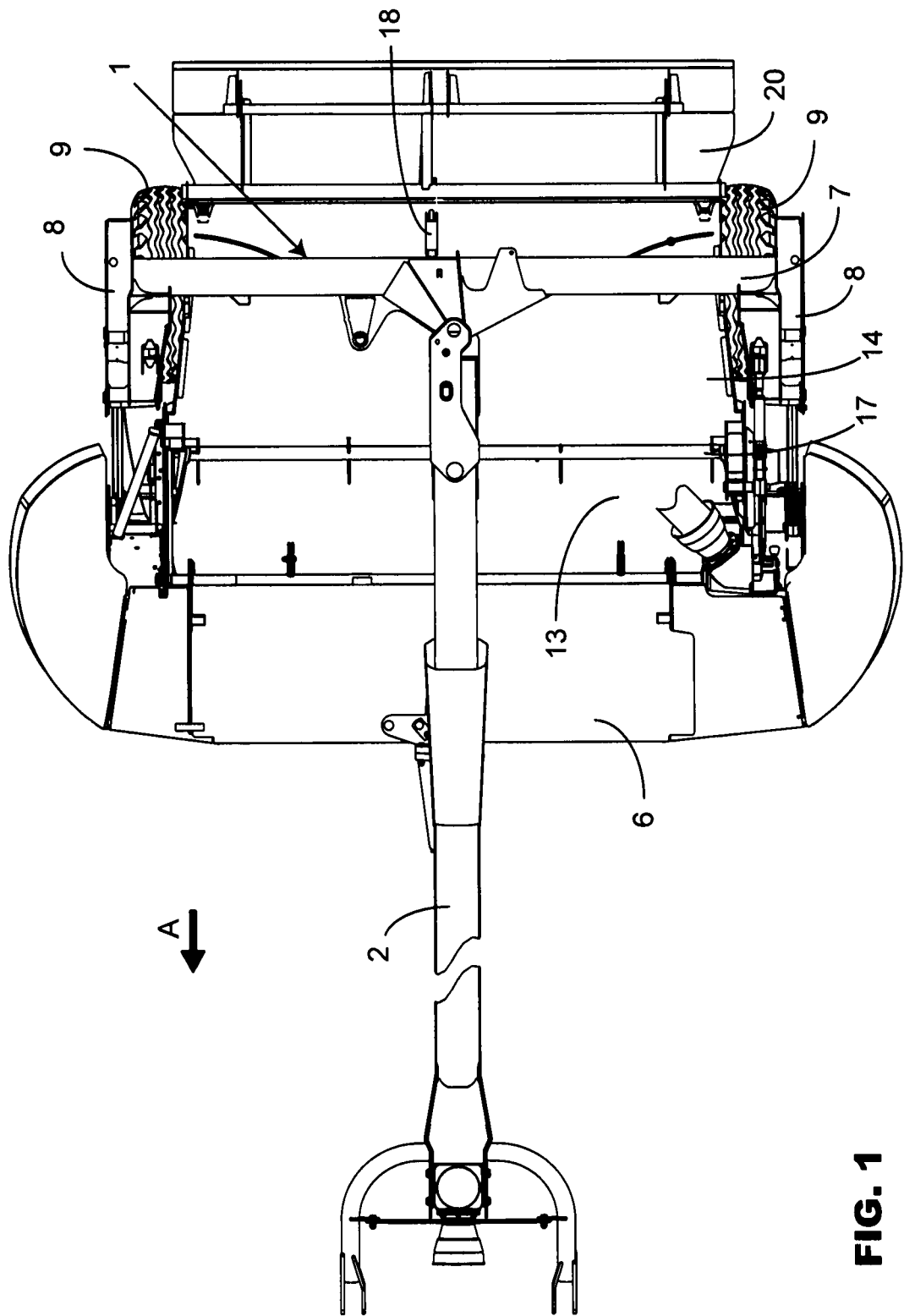
FIG. 1 shows a top view of the mower-conditioner.
Figure 2:
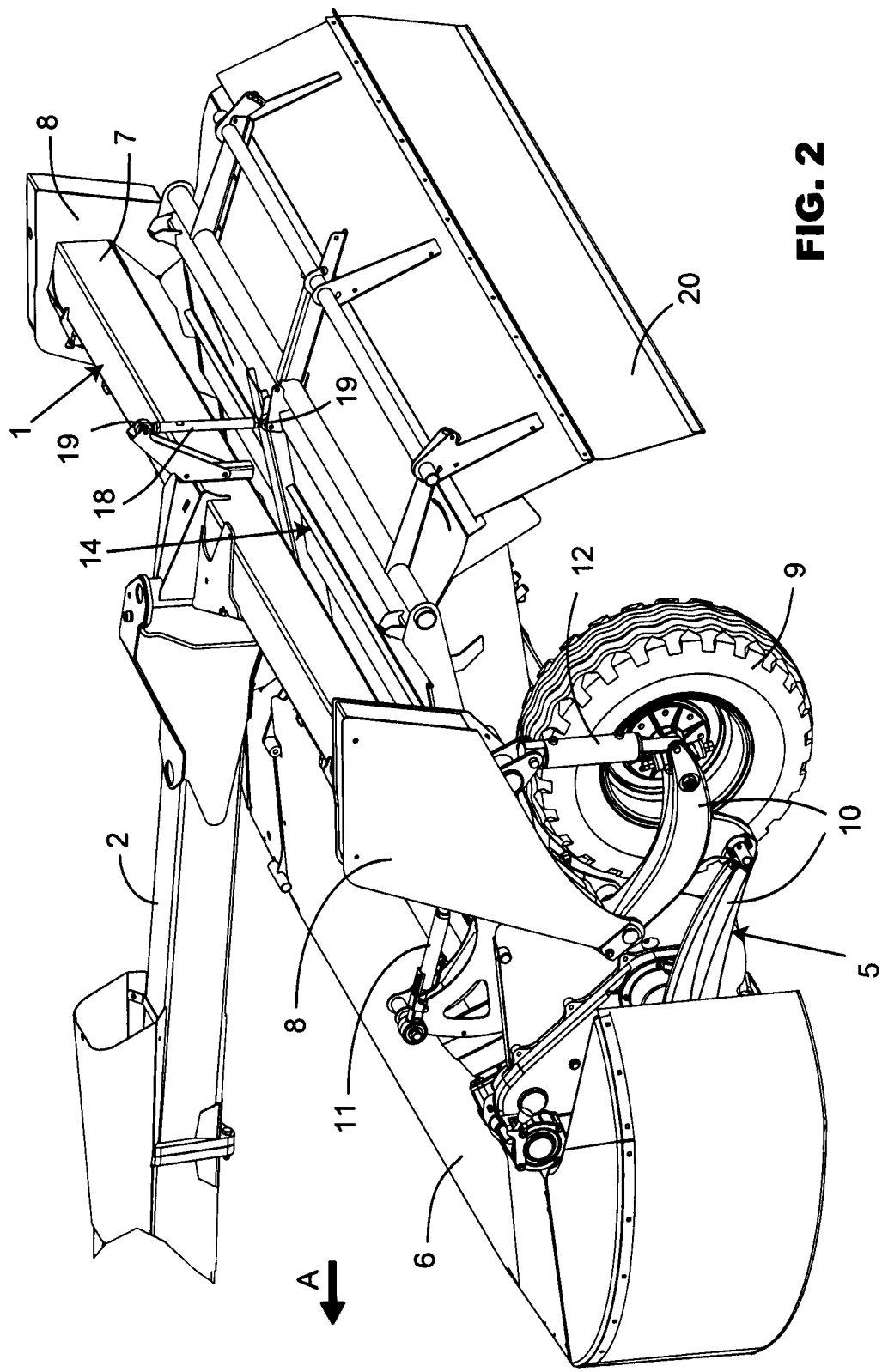
FIG. 2 is a perspective view of the rear of the machine.
Figure 3:
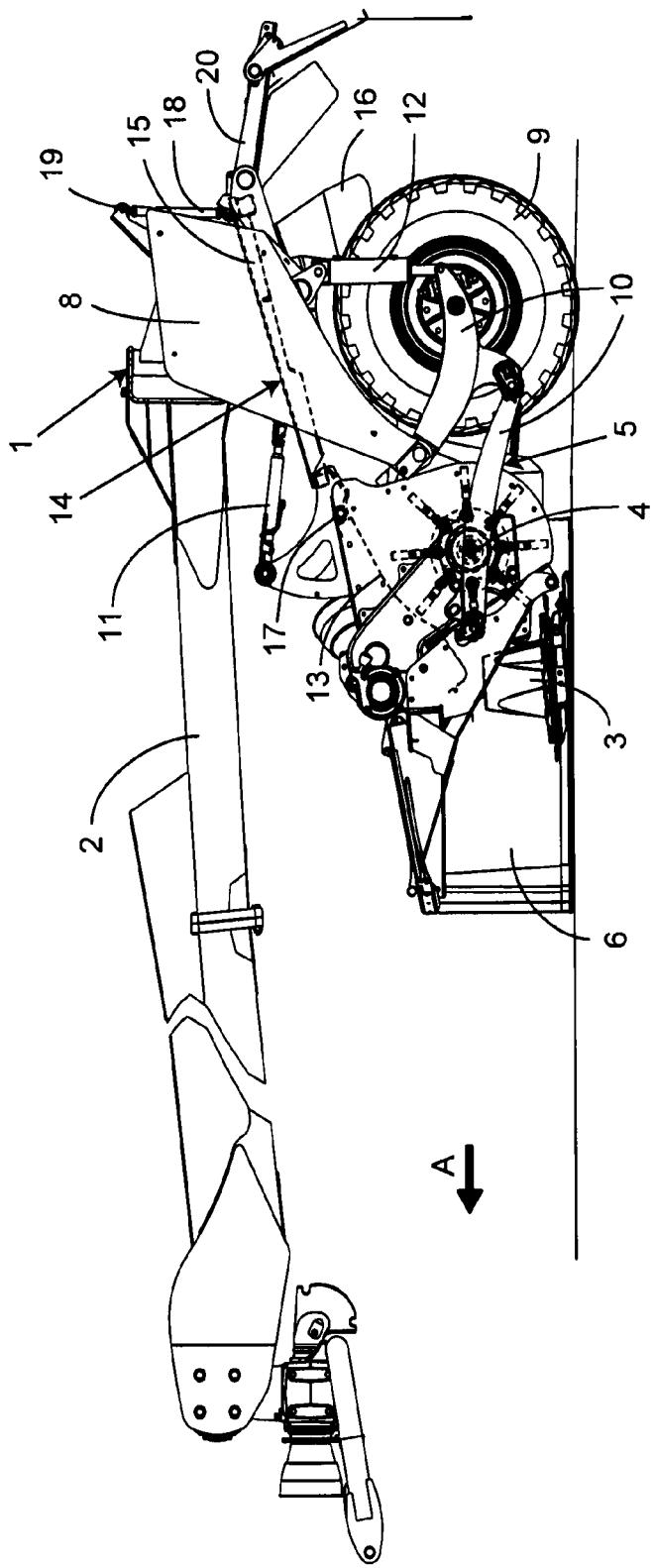
FIG. 3 shows a side view of the machine according to the invention with the cutter bar in the lowered work position.
Figure 4:
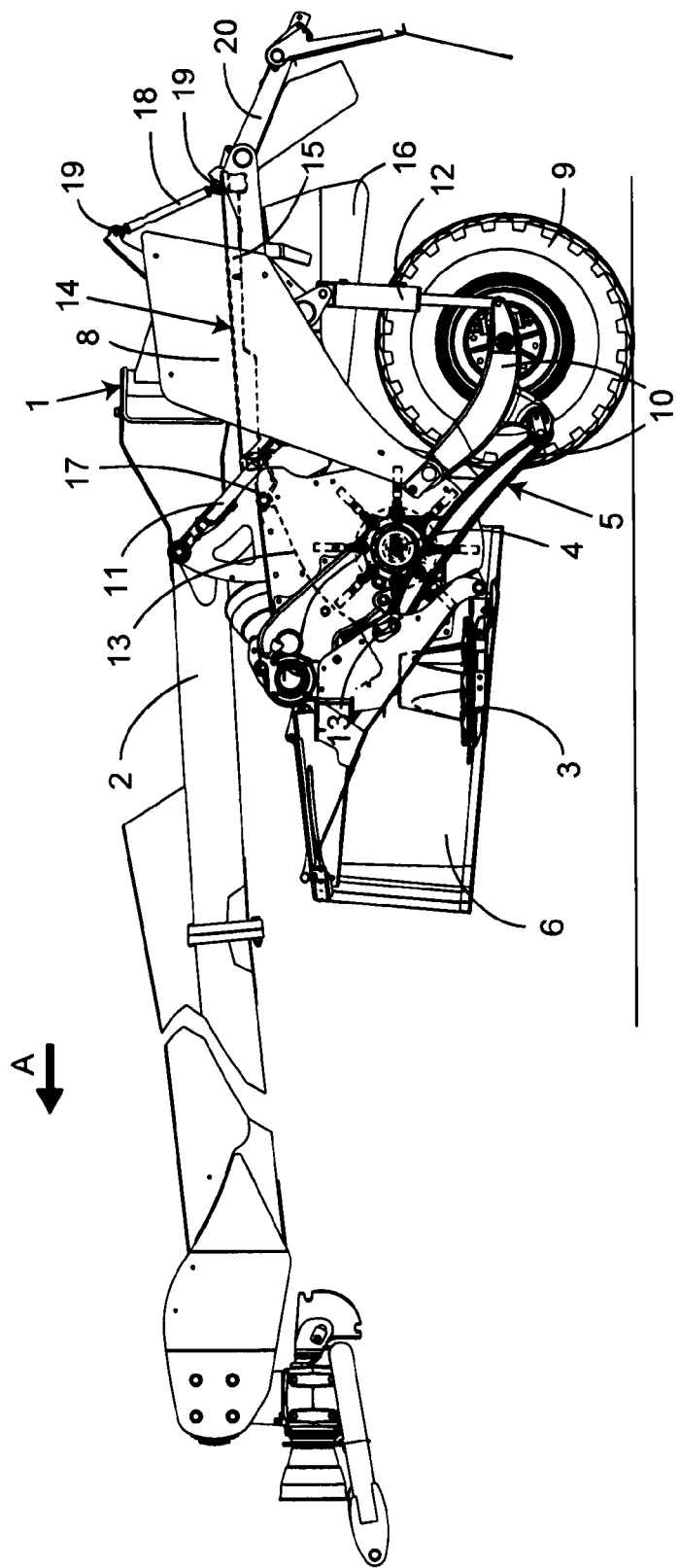
FIG. 4 shows a side view of the machine with the cutter bar in the raised position, for example to pass over a large bump in the land.

As illustrated in FIGS. 1 to 6, the mower-conditioner according to the invention comprises a frame (1) carrying a mowing mechanism that is equipped with a cutting device (3), a plant conditioning system (4), and means (5) for lifting these elements relative to the ground.

The machine is coupled to a tractor that enables it to be moved in a travel direction (A) and to be actuated by means of a drawbar (2) provided at its front end with a coupling device such as is known in the field of agricultural machinery.

In order to ensure the safety of the machine with regard to the assembly consisting of the work elements rotating at high speed, the mower-conditioner is equipped with a hood (6) that surrounds the entire front part of the machine.

The various elements of the machine are carried by the frame (1) which forms the framework and supports the work elements, the actuators and the protections. The frame (1) particularly comprises a transverse beam (7) fastened to the drawbar (2), two lateral supports (8) and various structural elements, the lateral supports (8) carrying wheels (9) that bear the weight of the machine.

The work elements, essentially the cutter bar (3) and the plant conditioning system (4) shown in FIGS. 3 to 6, are connected to the frame (1) by lifting means (5) which consist of levers (10 and 11) and which enable said work elements to move heightwise. For this purpose, these levers (10 and 11) are articulated both to the frame (1) and to the work elements. In addition, hydraulic jacks (12) disposed between the frame (1) and the levers (10) ensure the lowering of said work elements towards the ground into the work position in which the cutting elements are parallel to the ground, and the lifting of said work elements for passing over an obstacle on the ground, for example, and for being brought into the transport position.

The cutter bar (3) of the mowing section may include in a known manner discs arranged side by side on a support, and which are driven in high-speed rotation in a plane parallel to the ground so as to cut the plants.

After mowing, the plants are caught by the plant conditioning system (4), which may for example have the form of a drum driven in rotation and equipped with flails that collect the cut fodder. This drum is partially surrounded by a fairing (13) that begins above and in front of the cutter bar (3), where it is connected to the hood (6). The plants are then processed to speed up the drying process and are then discharged into the plant ejection channel (14) in order to be ejected towards the rear of the machine onto the ground.

The plant ejection channel (14) extends towards the rear of the machine beyond the wheels (9). It consists of an upper part (15) and of two side plates (16). These side plates are arranged in planes oriented in the direction of travel (A) and towards the inside of the machine relative to the wheels (9).

According to the invention, the plant ejection channel (14) is an extension of the plant conditioning system (4) and is articulated to the fairing (13) of the front part of the machine, the fairing (13) following the displacement of the work tools (3 and 4) during lifting or lowering towards the operative position.

Thus, according to the invention the joint between the fairing (13) and the plant ejection channel (14) is achieved by means of a transverse axis (17) connecting the two parts.

Because of this joint, the work assembly does not form a single solid block with the plant ejection channel (14). The movement of the work assembly essentially causes the front end of the plant ejection channel (14) to move about the transverse axis (17).

Figure 5:
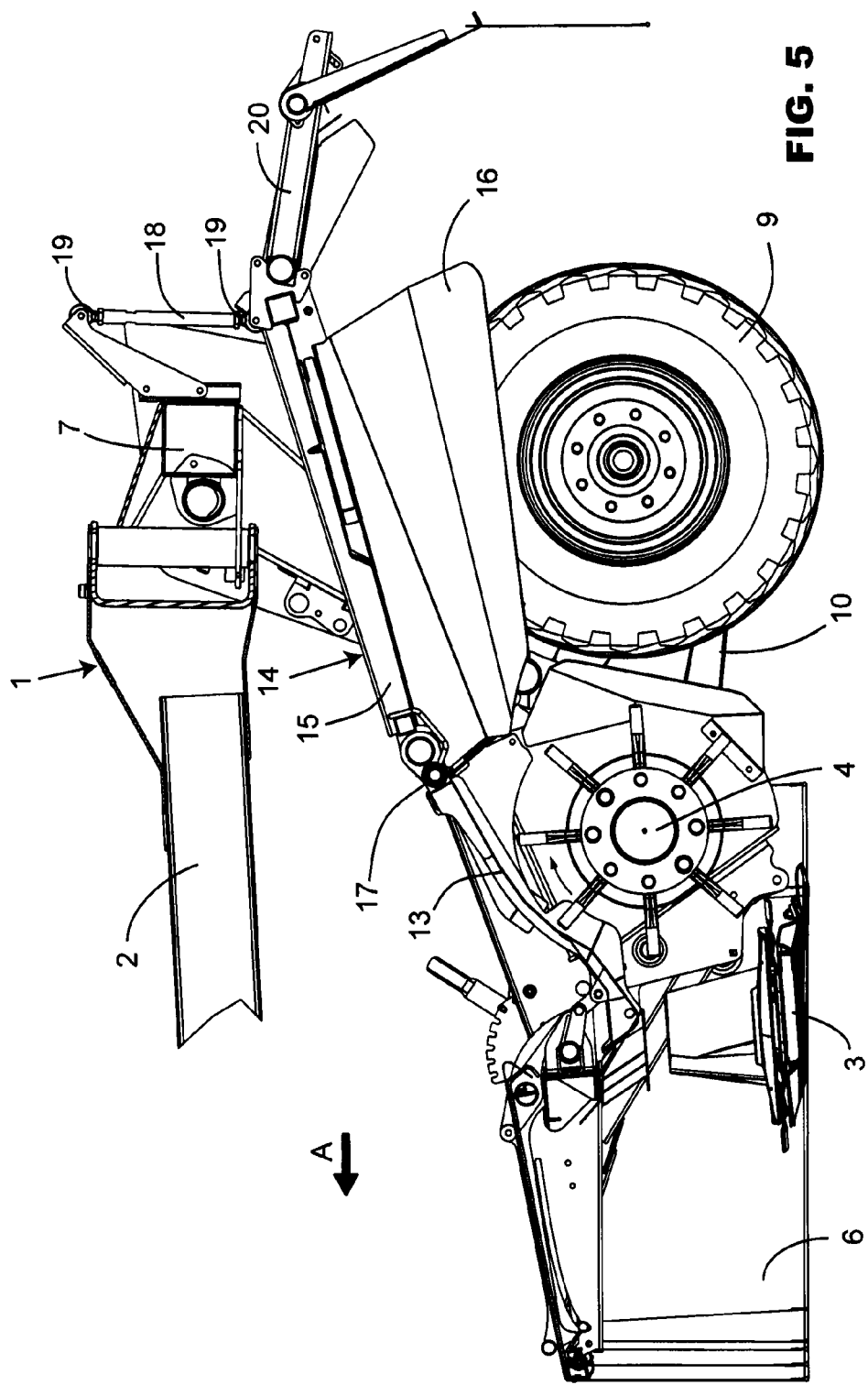
FIG. 5 represents a section along a longitudinal median plane of the machine in FIG. 3.
Figure 6:
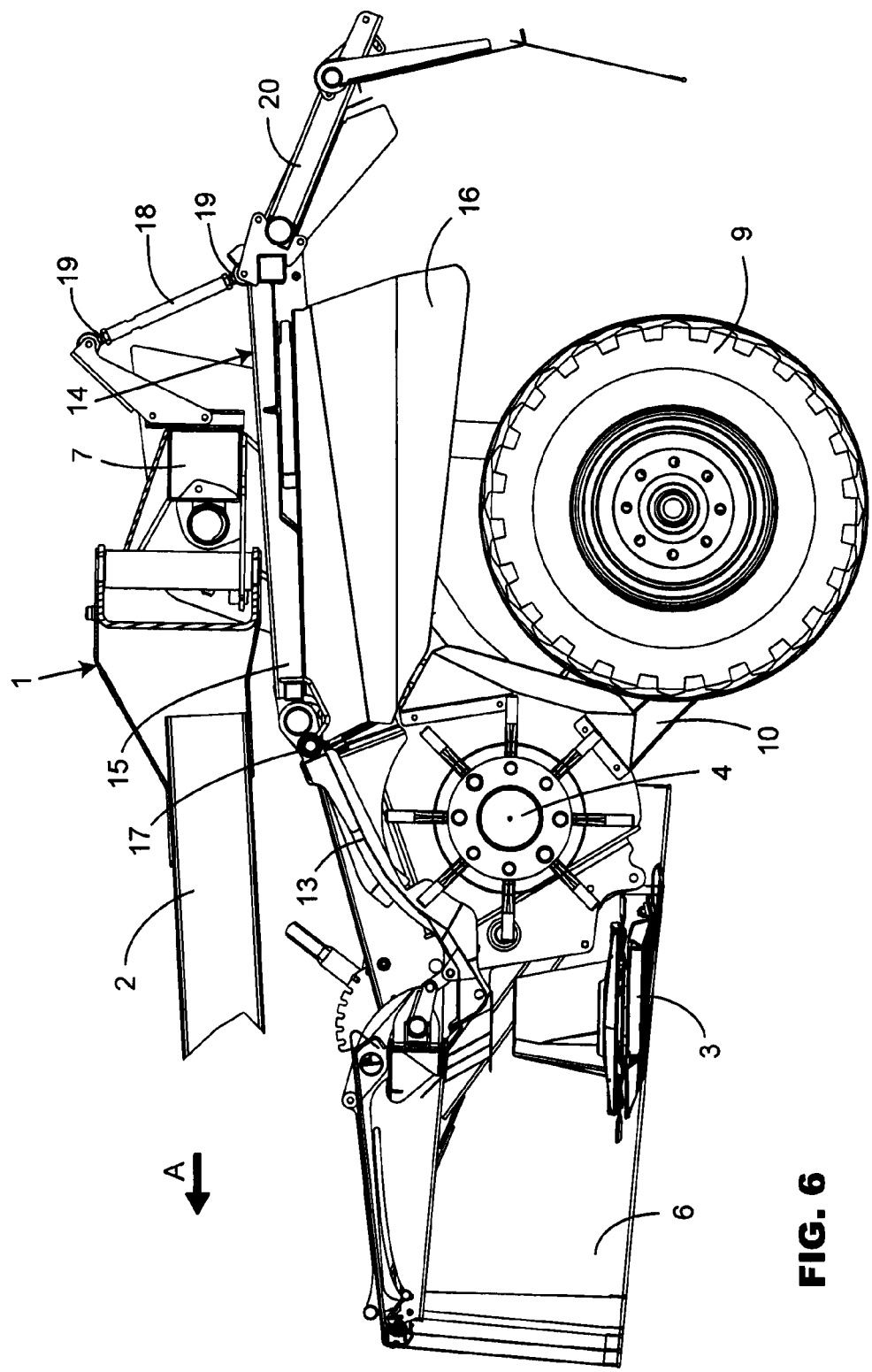
FIG. 6 represents a section along a longitudinal median plane of the machine in FIG. 4.

As is shown in FIGS. 5 and 6, the transverse axis (17) is arranged inside the machine, above and slightly behind the plant conditioning system (4), at the inlet of the plant ejection channel (14) and in the upper part thereof.

Advantageously according to the invention, the size of the transverse axis (17) essentially corresponds to the width of the machine between the wheels (9).

As is shown in FIGS. 2 to 6, the plant ejection channel (14) is articulated to the frame by means of one or more rods (18).

According to the invention, the rod (18) is fastened by one of its ends to the transverse beam (7) that forms part of the frame (1), and is connected by its other end to the upper outer part (15) of the plant ejection channel (14).

The rod (18) is advantageously provided at its both ends with ball joints (19) to ensure flexible articulation to the beam (7) of the frame (1) on the one hand and to the rear part of the plant ejection channel (14) on another end.

The ball joints (19) enable a slight deflection, particularly a lateral deflection, which prevents the parts from being subjected to excessive stresses and the equipment from being exposed to an accelerated wear.

According to the invention, the mower-conditioner is thus characterized in that the fairing (13) is articulated to the plant ejection channel (14) and that the plant ejection channel (14) is itself articulated to the frame (1).

Due to these two joints, the front part including the work tools (3 and 4) is able to move without significantly affecting the rear part of the plant ejection channel (14).

According to the invention, the plant ejection channel (14) is provided at its end part with a plant deflector (20) that directs the plants towards the ground, the position of which plant deflector (20) remains essentially the same whether the work tools (3 and 4) are in the raised position or in the lowered position for work.

Advantageously according to the invention, the plant deflector (20) comprises several panels that are connected to each other and oriented so as to throw the plants back towards the ground.

Inside the plant deflector (20), the angle between each panel can be adjusted in order to orient the ejection of the plants.

Several variants are possible with regard to the joint (17) between the work assembly and the plant ejection channel (14). A transverse axis (17) extending over the width of the machine was previously described advantageously, but another type of joint may equally be conceivable, essentially at the same location on the machine, or a joint with two transverse axes, or even a transverse axis extending over part of the width of the machine, without departing from the scope of the invention.

As regards the joint (18, 19) between the rear part and the frame (1), it is also possible to conceive a different type of joint and different variants with respect to the positioning of the rod (18), or to the arrangement of a second rod. Interfaces other than ball joints (19) may also be envisaged to serve as the ends of the rod (18) without departing from the scope of the invention.

The means for lifting the work tools (3 and 4), the sensors arranged on the machine, the tools carried by the cutter bar (3) and the plant conditioning system (4) as well as the various means for controlling the machine may have many different forms, and the mower-conditioner may be of larger or smaller size without departing from the scope of the invention.

Of course, the invention is not limited to the embodiments described and illustrated for exemplary purposes here, but it also extends to all technical equivalents and combinations thereof.

The invention claimed is:

1. A mower-conditioner comprising:
   a frame carrying a plant mowing mechanism including a cutting device;
   a plant conditioning system and means for lifting both the cutting device and the plant conditioning system relative to the frame between a raised position and a lowered position for work;
   a fairing; and
   a plant ejection channel positioned as an extension of the plant conditioning system,
   wherein the fairing is articulated to the plant ejection channel by a joint formed by a transverse axis positioned inside the mower-conditioner, above and behind the plant conditioning system, and the plant ejection channel is itself articulated to the frame such that movement of the plant mowing mechanism causes a front end of the plant ejection channel to move about the transverse axis.

2. The mower-conditioner according to claim 1, wherein the transverse axis is positioned inside the mower-conditioner at an inlet of the plant ejection channel and in an upper part thereof.

3. The mower-conditioner according to claim 1, wherein a size of the transverse axis essentially corresponds to a width of the mower-conditioner between wheels.

4. The mower-conditioner according to claim 1, wherein the plant ejection channel is articulated to the frame by at least one rod, which is fastened by one of its ends to a transverse beam that forms part of the frame, and is connected by another end to an upper outer part of the plant ejection channel.

5. The mower-conditioner according to claim 4, wherein the rod includes at its both ends ball joints to ensure flexible articulation to the frame on and to a rear part of the plant ejection channel.

6. The mower-conditioner according to claim 1, wherein the plant ejection channel includes at its end part a plant deflector whose position remains essentially the same whether the cutting device and the plant conditioning device are in the raised position or in the lowered position for work.

7. The mower-conditioner according to claim 6, wherein the plant deflector includes plural panels that are connected to each other and oriented so as to throw plants back towards the ground.

8. The mower-conditioner according to claim 7, wherein an angle between each panel of the plant deflector can be adjusted to orient ejection of the plants.

\* \* \* \* \*